Oct. 7, 1924.
C. S. RAYMOND
1,510,959
COMBINED BUMPER AND FENDER FOR AUTOMOBILES
Filed Dec. 13, 1923 2 Sheets-Sheet 1
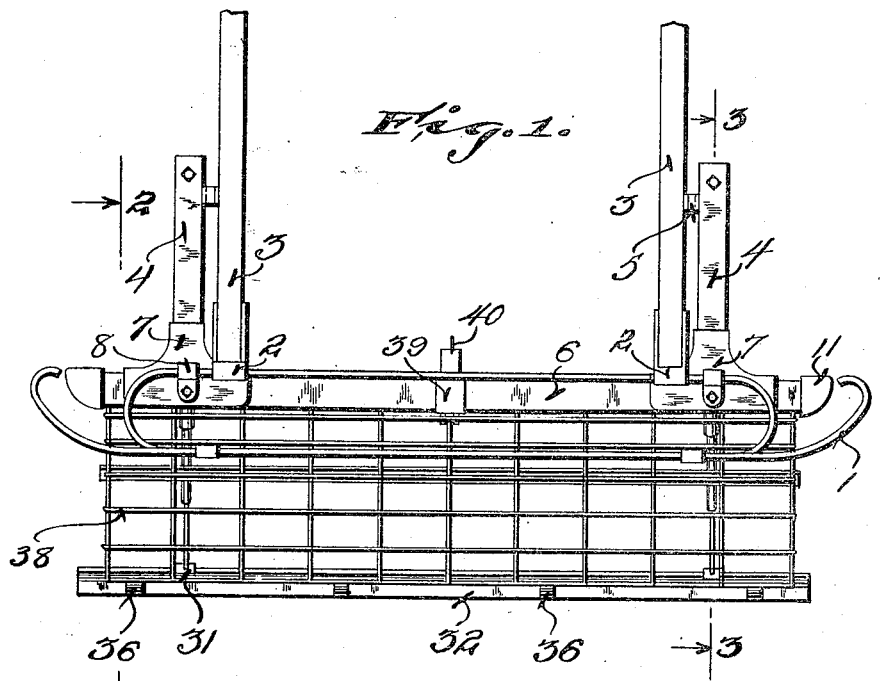
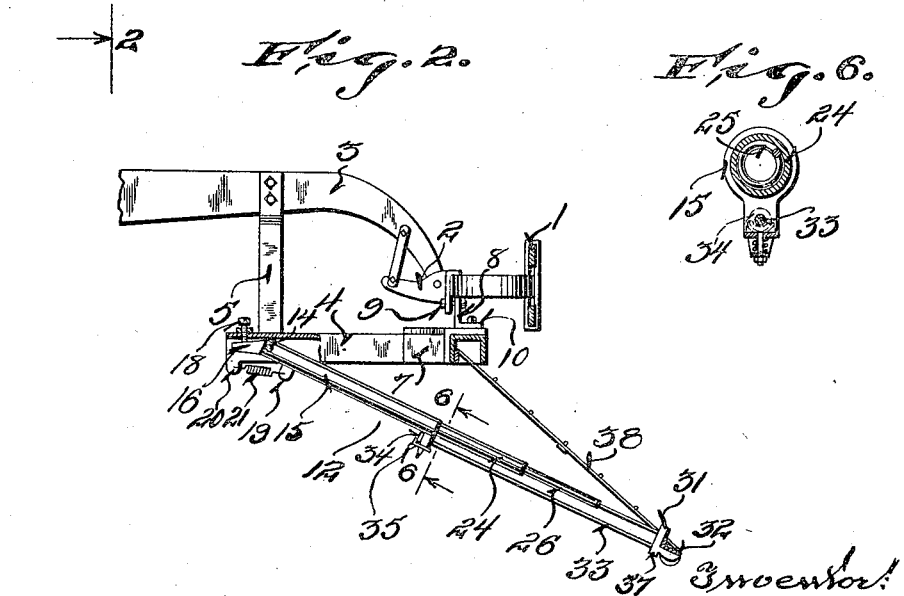
Witness:
Erwin B. Ewing
Inventor:
Charles S. Raymond
Attorneys Oct. 7, 1924.
C. S. RAYMOND
1,510,959
COMBINED BUMPER AND FENDER FOR AUTOMOBILES
Filed Dec. 13, 1923    2 Sheets-Sheet 2
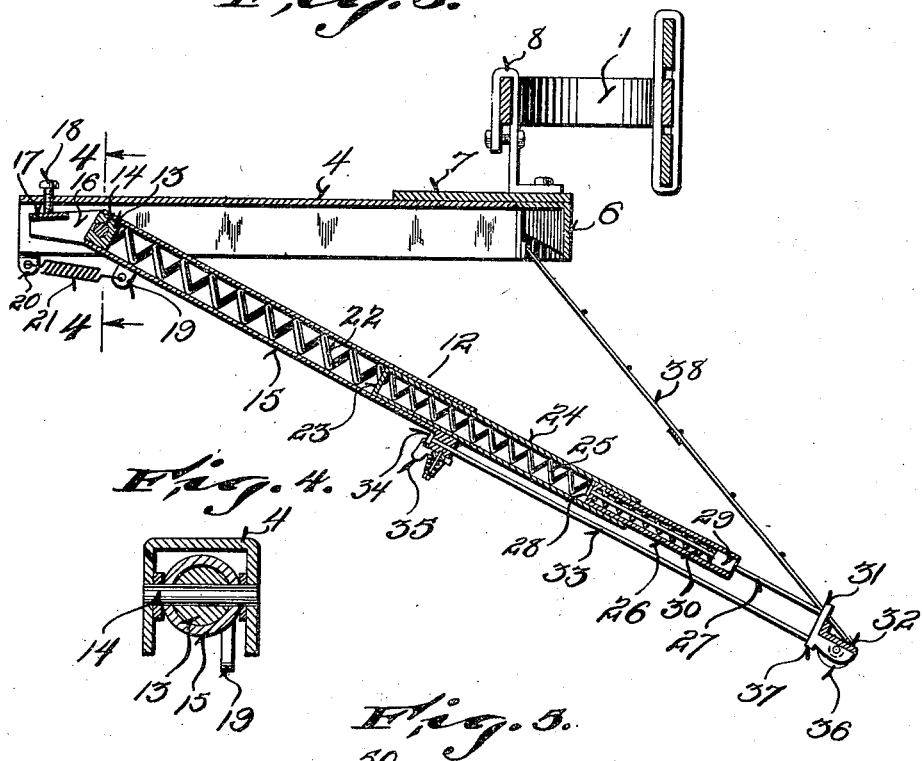
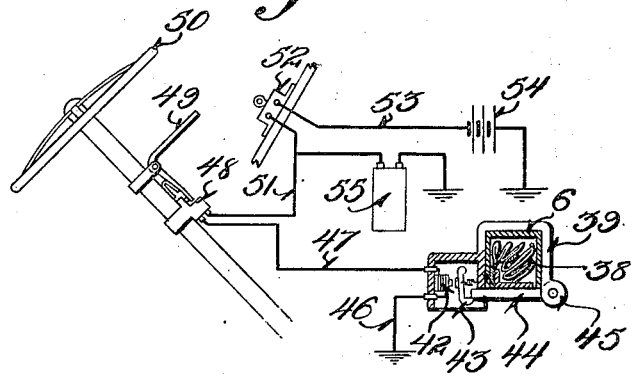
Inventor:
Charles S. Raymond
Witness:
Erwin B. Ering
By Young & Young
Attorneys Patented Oct. 7, 1924.

1,510,959

UNITED STATES PATENT OFFICE.

CHARLES S. RAYMOND, OF MILWAUKEE, WISCONSIN.

COMBINED BUMPER AND FENDER FOR AUTOMOBILES.

Application filed December 12, 1923. Serial No. 680,426.

*To all whom it may concern:*

Be it known that I, CHARLES S. RAYMOND, a citizen of the United States, and resident of Milwaukee, in the county of Milwaukee and State of Wisconsin, have invented certain new and useful Improvements in Combined Bumpers and Fenders for Automobiles; and I do hereby declare that the following is a full, clear, and exact description thereof.

This invention relates to a combined bumper and fender for an automobile.

Objects of this invention are to provide a combined bumper and fender in which the fender is of an extensible nature and is normally collapsed and held in a protected position with reference to the bumper, and in which the fender may be quickly projected forwardly and downwardly to extend a net in front of the automobile.

Further objects of this invention are to provide a combined bumper and fender whose elements are so associated that the structure may be readily attached to an automobile with the main portion of the fender suspended from the bumper, which will provide in effect a relatively rigidly braced structure supported from the side bars of the automobile, and in which the fender, when it is in collapsed position, is housed behind and below the bumper so that the fender is completely protected from damage by the projecting bumper.

Further objects are to provide a combined fender and bumper in which the fender is electrically controlled from the steering wheel or other easily accessible position, and in which means are provided whereby the fender is protected against inadvertent release when the ignition or other electrical system of the automobile is cut off.

This invention is an improvement over that disclosed in Patent No. 1,443,850 issued to me January 30, 1923, for combined bumper and fender for vehicles, and has the same general objects as those disclosed in such application.

An embodiment of the invention is shown in the accompanying drawings, in which:—

Figure 1 is a plan view of the combined bumper and fender showing the fender in its extended position and showing a portion of the side bars of an automobile.

Figure 2 is a sectional view on the line 2—2 of Figure 1.

Figure 3 is a sectional view on the line 3—3 of Figure 1, such view being drawn to an enlarged scale.

Figure 4 is a sectional view on the line 4—4 of Figure 3.

Figure 5 is a diagrammatic view showing primarily the wiring and a portion of the magnetically controlled retaining means for the fender.

Figure 6 is a sectional view on the line 6—6 of Figure 2.

The apparatus comprises a bumper 1 whose inner ends are held in brackets 2 attached to the side frame bars 3 of an automobile in any suitable manner, as shown in Figures 1 and 2. Beneath this bumper a pair of channel bars 4 are positioned and extend rearwardly to braces 5 by means of which latter members they are attached to the side frame bars 3 in a substantially rigid manner. A transverse channel iron 6 extends across the front of the machine in advance of the side frame bars and below the bumper. This transverse channel iron is joined to the channel iron 4 by means of castings 7. These castings are suspended from the bumper 1 by means of hook-shaped strap members 8 (see Figures 2 and 3) such strap members having opposed jaws clamped together and about the bumper 1 by means of bolts 9. These suspended strap members are provided with outwardly turned feet 10 which are bolted to the castings 7, as is clearly shown in Figures 2 and 3, thus rigidly attaching the front of the fender structure to that of the bumper. The ends of the transverse channel iron 6 may be capped by appropriately curved members 11 which give a finished appearance to the device.

It is to be noted from Figure 3 that the transverse channel iron 6 is cut out adjacent the channel irons 4 so that the interior or channels of the members 4 and 6 are in direct communication. The fender comprises a pair of extensible or telescopic members indicated generally at 12 in Figures 2 and 3, which are normally positioned within the channel irons 4. The rearmost of the members forming the telescopic support for the fender structure are each provided with plugs 13 through which pivot pins 14 pass and pivotally join such rear ends to the side flanges of the channel irons 4, as shown in Figure 3. The rearmost member 15 of the telescopic sections is provided with an extended portion 16 which has a flattened or bearing plate 17 formed integrally therewith. These bearing plates are adapted to contact with a set screw 18 threaded through the channel members 4, as illustrated in Figure 3, to limit the downward motion of the telescopic members. Lugs 19 are provided upon the sections 15, and corresponding lugs 20 are formed on the channel members 4. Tension springs 21 are interposed between these lugs and aid in rocking the telescopic members downwardly. If desired, suitable washers, as indicated in Figure 4, are provided on each side of the member 15 and are carried by the pivot pin 14 to properly position such member with respect to the channel iron.

The rearmost or largest of the sections of the telescope members carries a relatively large helical spring 22 which bears at one end against the plug 13 and at its other end against the base 23 of a smaller tubular member 24. Within this tubular member, a similar, though smaller, helical spring 25 is positioned and bears against the inner side of the base 23 at one end, and at its other end against the base of the smallest tubular member 26. This smallest tubular member 26 is provided with an apertured base through which a rod 27 slidably passes,— the rod being provided with an enlarged rear portion 28 to limit its outward motion. A collar 29 is rigidly secured to the rod, and a helical spring 30 is interposed between the collar and the base of the tubular member 26 to thus urge the rod 27 outwardly. Brackets 31 are carried by the rods 27 and in turn carry a transverse angle iron 32 which extends from one end of the apparatus to the other, as shown in Figure 1. Adjacent each of the telescopic members a second rod 33 is positioned and is rigidly attached at one end to the brackets 31, and at its other end is provided with an enlarged portion 34 adapted to latch beneath a spring pressed catch member 35 when the device is fully extended, as shown in Figure 3. A plurality of rollers 36 are carried by the angle iron 32, as shown in Figure 1. It is to be noted that the catch 35 is pivotally mounted and may be swung so that it extends in a forwardly direction and is adapted to engage a shoulder or projection 37 formed upon the casting 31 so that, if desired, as hereinafter described, the catch may be swung forwardly and may engage the shoulder 37 to retain the device in collapsed position during certain manipulations thereof to be hereinafter described. Any suitable form of net such as indicated at 38, may be provided and may have its forward end attached to the channel iron 32 and its rear end attached upon the inner side of the inner flange of the channel iron 6, as shown in Figure 3.

A U-shaped casting 39 (see Figures 1 and 5) surrounds the channel iron 6 and is located substantially centrally thereof. It is provided with a rearward extension 40 which houses an electromagnet 42 provided with a resiliently urged pivotally mounted catch 43 acting as the armature of such magnet. This catch normally retains a flap 44 which is pivotally mounted between ears 45 formed on the forward portion of the U-shaped member 39. The electromagnet 42 has one side grounded to the frame of the machine through the conductor 46 and its other side connected through the conductor 47 to a switch 48 controlled by a hand lever 49 adjacent the steering wheel 50. From this switch a conductor 51 leads to the usual switch 52 provided on the dash of the machine, and from such switch a conductor 53 leads to the battery 54,—the other end of the battery being ground to the frame of the machine, as indicated. The other electrical devices such as the spark coils, timers, etc. indicated generally at 55, are joined to conductor 51 on one side and are grounded on the other, as shown in Figure 5.

In describing the operation of the apparatus, it will be assumed that the operator starts with the fender in its extended position. To contract the fender he presses first one of the telescopic members 12 into collapsed position and then the other,—the catch 35 being turned forwardly and engaging the projection 37 in each case, thereby temporarily holding the members 12 in their contracted position. While the device is in this condition, it is bodily rocked upwardly about the pivot pins 14,—the net 38 being suitably folded, as shown in Figure 5, and positioned within the transverse channel iron 6. Such channel iron also receives the transverse angle iron 32 and houses such member,—the telescopic members being housed within the channel irons 4. Thereafter, the flap 44 is rocked into locked position, as shown in Figure 5, and retains the fender in this collapsed and hidden position. The catches 35 are then released and are turned rearwardly into the position indicated in Figure 3. When it is desired to release the apparatus, it is merely necessary for the driver to manipulate the handle 49 which, as will be seen from Figure 5, is in close proximity to the hand wheel and may be easily operated by the driver in a substantially instantaneous manner. This permits current from the battery 54 to energize the electromagnet 42 thus retracting the catch 43 and permitting the flap 44 to fall downwardly thus allowing the fender to rock downwardly due to its own weight and to the action of the springs 21 (see Figure 3). As the fender moves downwardly, the telescopic members 12 are quickly extended to their greatest extent thus stretching the net 38 downwardly and in front of the machine. As the telescopic members 12 arrive at their final position, the enlargements 34 of the lower rods 33 snap beneath the catches 35 and retain the telescopic members in their extended position.

It will be seen from reference to Figure 5 that when the ignition of the engine is cut off at the switch 52, that the electrical system for the release magnet of the fender is also opened and consequently the fender may not be inadvertently released. This is of considerable importance in the successful operation of the apparatus as it prevents any one from tampering or playing with the device in the absence of the driver.

It will be seen, therefore, that the fender is normally completely hidden and the net stored in the channel members and that such fender may be quickly released and projected downwardly and outwardly, as illustrated in Figures 2 and 3, by a simple and easily effected operation of the driver.

It is to be particularly noted that the fender, under normal conditions, is housed rearwardly of the bumper and that the entire fender structure is fully protected by the forwardly positioned bumper 1. The fender, therefore, is under normal conditions, fully protected by the bumper and damage to such fender is prevented.

Although the invention has been described in considerable detail, it is to be understood that the invention may be variously embodied and is, therefore, to be limited only as claimed.

I claim:

1. In an automobile having side frame bars the combination of an outwardly projecting bumper carried by said side frame bars, and a fender comprising a pair of supporting arms secured to said side frame bars and to said bumper and located rearwardly of said bumper, said fender having a pair of telescopic members biased to extended position and pivoted to said supporting arms, a net carried by said fender, electrically operated means for normally retaining said fender in contracted position adjacent said arms, and a switch mounted within easy access of the driver for controlling said electrical means, said fender when in contracted position being positioned beneath and rearwardly of said bumper.

2. In a device of the class described the combination of a pair of channel irons adapted to be attached to an automobile, a transverse channel iron joining said pair of channel irons and opening thereinto, a pair of telescopic members pivotally mounted within said pair of channel irons and adapted to be normally housed therein, resilient means tending to elongate said telescopic members, a transverse member carried by the outer ends of said telescopic members, a net having its upper and lower ends joined to said transverse channel iron and to said transverse member, respectively, said transverse member and net being normally housed within said transverse channel iron, a latch for retaining said transverse member and net in housed position, an electromagnetic member for releasing said latch, and a manually manipulable switch controlling said electromagnetic member.

In testimony that I claim the foregoing I have hereunto set my hand at Milwaukee, in the county of Milwaukee and State of Wisconsin.

CHARLES S. RAYMOND.